(12) United States Patent
Daly et al.

(10) Patent No.: US 12,045,732 B2
(45) Date of Patent: *Jul. 23, 2024

(54) AUTOMATED DYNAMIC DATA QUALITY ASSESSMENT

(71) Applicant: ByteDance Inc., Wilmington, DE (US)

(72) Inventors: Mark Thomas Daly, San Francisco, CA (US); Shawn Ryan Jeffery, Burlingame, CA (US); Matthew DeLand, San Francisco, CA (US); Nick Pendar, San Ramon, CA (US); Andrew James, Los Altos, CA (US); David Johnston, Portola Valley, CA (US)

(73) Assignee: Bytedance Inc., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/684,935

(22) Filed: Mar. 2, 2022

(65) Prior Publication Data

US 2022/0300828 A1 Sep. 22, 2022

Related U.S. Application Data

(63) Continuation of application No. 16/433,762, filed on Jun. 6, 2019, now Pat. No. 11,295,215, which is a
(Continued)

(51) Int. Cl.
*G06F 16/00* (2019.01)
*G06F 16/215* (2019.01)
(Continued)

(52) U.S. Cl.
CPC ............. *G06N 5/02* (2013.01); *G06F 16/215* (2019.01); *G06F 16/2358* (2019.01); *G06F 16/2365* (2019.01); *G06N 20/00* (2019.01)

(58) Field of Classification Search
CPC . G06F 16/215; G06F 16/2358; G06F 16/2365
See application file for complete search history.

(56) References Cited

U.S. PATENT DOCUMENTS

| 6,112,210 A | 8/2000 | Nori et al. |
| 6,484,177 B1 | 11/2002 | Van et al. |

(Continued)

OTHER PUBLICATIONS

Donmex et al., "Proactive Learning: Cost-Sensitive Active Learning with Multiple Imperfect Oracles," dl.acm.org, CIKM'08, Oct. 26-30, 2008, ACM, pp. 629-638. (Year: 2008).*
(Continued)

*Primary Examiner* — Cheryl Lewis
(74) *Attorney, Agent, or Firm* — ALSTON & BIRD LLP

(57) ABSTRACT

In general, embodiments of the present invention provide systems, methods and computer readable media for automated dynamic data quality assessment. One aspect of the subject matter described in this specification includes the actions of receiving a data quality job including a new data sample; and, if the new data sample is determined to be added to a reservoir of data samples, sending a quality verification request to an oracle; receiving a new data sample quality estimate from the oracle; and adding the new data sample and estimate to the reservoir. A second aspect of the subject matter includes the actions of receiving, from a predictive model, a judgment associated with a new data sample; analyzing the new data sample based in part on the judgment to determine whether to send a new data sample quality verification request to an oracle; and, if a new data sample quality estimate is received from the oracle, determining whether to add the new data sample and the judgment to the reservoir.

20 Claims, 6 Drawing Sheets

Related U.S. Application Data continuation of application No. 15/619,786, filed on Jun. 12, 2017, now Pat. No. 10,360,516, which is a continuation of application No. 15/161,495, filed on May 23, 2016, now Pat. No. 9,703,823, which is a continuation of application No. 14/088,248, filed on Nov. 22, 2013, now Pat. No. 9,390,112.

(51) Int. Cl.
  *G06F 16/23* (2019.01)
  *G06N 5/02* (2023.01)
  *G06N 20/00* (2019.01)

(56) References Cited

U.S. PATENT DOCUMENTS

| | | | |
|---|---|---|---|
| 7,007,275 | B1 | 2/2006 | Hanson et al. |
| 7,134,024 | B1 | 11/2006 | Binding et al. |
| 8,285,656 | B1 | 10/2012 | Chang et al. |
| 8,849,736 | B2 | 9/2014 | Miranda et al. |
| 9,122,710 | B1 | 9/2015 | Jeffery et al. |
| 9,152,727 | B1 | 10/2015 | Balducci et al. |
| 9,235,652 | B1 | 1/2016 | Jeffery et al. |
| 9,390,112 | B1 | 7/2016 | Daly et al. |
| 9,465,857 | B1 | 10/2016 | Deland et al. |
| 9,600,776 | B1 | 3/2017 | Daly et al. |
| 9,703,823 | B2 | 7/2017 | Daly et al. |
| 2003/0149676 | A1 | 8/2003 | Kasabov |
| 2004/0205482 | A1 | 10/2004 | Basu et al. |
| 2005/0203978 | A1 | 9/2005 | Abraham |
| 2005/0278309 | A1 | 12/2005 | Evans et al. |
| 2006/0020509 | A1 | 1/2006 | Strain et al. |
| 2006/0112130 | A1 | 5/2006 | Lowson |
| 2008/0065630 | A1 | 3/2008 | Luo et al. |
| 2009/0228445 | A1 | 9/2009 | Gangal |
| 2010/0036806 | A1 | 2/2010 | Lam et al. |
| 2013/0111005 | A1 | 5/2013 | Chu et al. |
| 2013/0124958 | A1 | 5/2013 | Mendelovich et al. |
| 2014/0025641 | A1 | 1/2014 | Kumarasamy et al. |
| 2014/0047351 | A1 | 2/2014 | Cui et al. |
| 2014/0059561 | A1 | 2/2014 | Grasselt et al. |
| 2014/0237450 | A1 | 8/2014 | Levy et al. |
| 2014/0279934 | A1 | 9/2014 | Li et al. |
| 2015/0046092 | A1 | 2/2015 | Chok et al. |
| 2016/0162507 | A1 | 6/2016 | Gupta et al. |
| 2017/0024427 | A1 | 1/2017 | Daly et al. |

OTHER PUBLICATIONS

Goldberg et al., "A Dynamic Oracle for Arc-Eager Dependency Parsing," Proceedings of COLING 2012: Technical Papers, pp. 959-976, 2012. (Year: 2012).*

Afrati et al., "Adaptive-Sampling Algorithms for Answering Aggregation Queries on Web Sites," ScienceDirect Data & Knowledge Engineering 64 (2008) pp. 462-490. (Year: 2008).

Burr Settles, "Active Learning Literature Survey", Computer Sciences Technical Report 1648, University of Wisconsin-Madison, Jan. 26, 2010, pp. 1-67.

U.S Patent Application filed on Nov. 22, 2013., U.S. Appl. No. 14/088,247.

U.S. Appl. No. 15/427,908, filed Feb. 8, 2017.

Donmex et al., "Proactive Learning: Cost-Sensetive Active Learning with Multiple Imperfect Oracles," dl.acm.org.CIKM'08, Oct. 26-30, 2008, ACM, pp. 629-638. (Year: 2008).

Russel J Ryan, "Groundtruth Budgeting: A Novel Approach to Semi-Supervised Relation Extraction in Medical Language", 2009, MIT, pp. 1-69 (Year: 2009).

* cited by examiner

AUTOMATED DYNAMIC DATA QUALITY ASSESSMENT

CROSS REFERENCE TO RELATED APPLICATIONS

This application is a continuation of U.S. patent application Ser. No. 16/433,762, titled "AUTOMATED DYNAMIC DATA QUALITY ASSESSMENT," filed Jun. 6, 2019, which is a continuation of U.S. patent application Ser. No. 15/619,786, now U.S. Pat. No. 10,360,516, titled "AUTOMATED DYNAMIC DATA QUALITY ASSESSMENT," filed Jun. 12, 2017, which is a continuation of U.S. patent application Ser. No. 15/161,495, now U.S. Pat. No. 9,703,823, titled "AUTOMATED DYNAMIC DATA QUALITY ASSESSMENT," filed May 23, 2016, which is a continuation of U.S. patent application Ser. No. 14/088,248, now U.S. Pat. No. 9,390,112, titled "AUTOMATED DYNAMIC DATA QUALITY ASSESSMENT," filed Nov. 22, 2013, the contents of which are hereby incorporated by reference herein in their entirety.

FIELD

Embodiments of the invention relate, generally, to automated dynamic data quality assessment.

BACKGROUND

A system that automatically identifies new businesses based on data sampled from a data stream representing data collected from a variety of online sources (e.g., websites, blogs, and social media) is an example of a system that processes dynamic data. Analysis of such dynamic data typically is based on data-driven statistical models that depend on consistent data quality, yet dynamic data is inherently inconsistent in its quality.

Current methods for dynamic data quality assessment exhibit a plurality of problems that make current systems insufficient, ineffective and/or the like. Through applied effort, ingenuity, and innovation, solutions to improve such methods have been realized and are described in connection with embodiments of the present invention.

SUMMARY

In general, embodiments of the present invention provide herein systems, methods and computer readable media for automated dynamic data quality assessment.

In general, one aspect of the subject matter described in this specification can be embodied in systems, methods, and computer program products that include the actions of receiving a data quality job, the data quality job including configuration data and a new data sample having a particular data type, wherein the configuration data comprises an oracle identifier; determining whether to add the new data sample to a reservoir of data samples identified based at least in part on the particular data type; and, in an instance in which the new data sample is to be added to the reservoir of data samples, performing actions including sending, to an oracle selected based on the oracle identifier, a quality verification request including the new data sample; receiving a data quality estimate associated with the new data sample from the oracle in response to the quality verification request; and adding the new data sample and the associated data quality estimate to the reservoir of data samples in response to receiving the data quality estimate.

These and other embodiments can optionally include one or more of the following features. The actions may further include updating the reservoir summary statistics. Updating the reservoir summary statistics may include calculating an overall data quality estimate for the reservoir using data quality estimates respectively associated with each of the data samples; and calculating a statistical variance for the data samples. Updating the reservoir summary statistics may further include logging the updated reservoir summary statistics in persistent storage. The actions may further include receiving corpus summary statistics calculated for a corpus of previously collected data samples; and generating an analysis comparing the updated reservoir summary statistics with the corpus summary statistics. Determining whether to add the new data sample to the reservoir may be based on at the value of at least one of the attributes of the new data sample. Determining whether to add the new data sample to the reservoir may be based on a probabilistic sampling approach. The new data sample may be collected from a data stream. The new data sample may be a single data instance or a set of data instances collected from a data stream. The new data sample may have been pre-processed by a data cleaning process.

In general, a second aspect of the subject matter described in this specification can be embodied in systems, methods, and computer program products that include the actions of receiving, from a predictive model, a judgment associated with a new data sample having a particular data type; analyzing the new data sample based in part on the judgment and on summary statistics associated with a reservoir of data samples identified based at least in part on the particular data type; determining whether to send a quality verification request including the new data sample to an oracle; and, in an instance in which the quality verification request is sent to the oracle, performing actions including receiving a data quality estimate associated with the new data sample from the oracle in response to the quality verification request; and determining whether to add the new data sample and the associated judgment to the reservoir of data samples in response to receiving the data quality estimate for the new data sample from the oracle.

These and other embodiments can optionally include one or more of the following features. The actions may further include updating the reservoir summary statistics in an instance in which the new data sample and its judgment are added to the reservoir. The actions may further include comparing the reservoir summary statistics to training data summary statistics derived from a set of training data samples having the particular data type, wherein the predictive model is adapted using the set of training data samples; and determining, based in part on the comparing, whether to update the set of training data samples. In an instance in which the set of training data samples is updated, the actions may include selecting at least one data sample and its associated judgment from the reservoir of data samples; and updating the set of training data samples using the selected data sample and its associated judgment. The judgment may include a confidence value. Determining whether to add the new data sample to the reservoir may include determining whether the new data sample statistically belongs in the reservoir. The data quality estimate may include a second judgment generated by the oracle, and determining whether to add the new data sample and its judgment to the reservoir may include determining whether the judgment and the second judgment match; and, in an instance in which the judgment and the second judgment do not match, replacing the judgment with the second judgment.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

Figure 5:
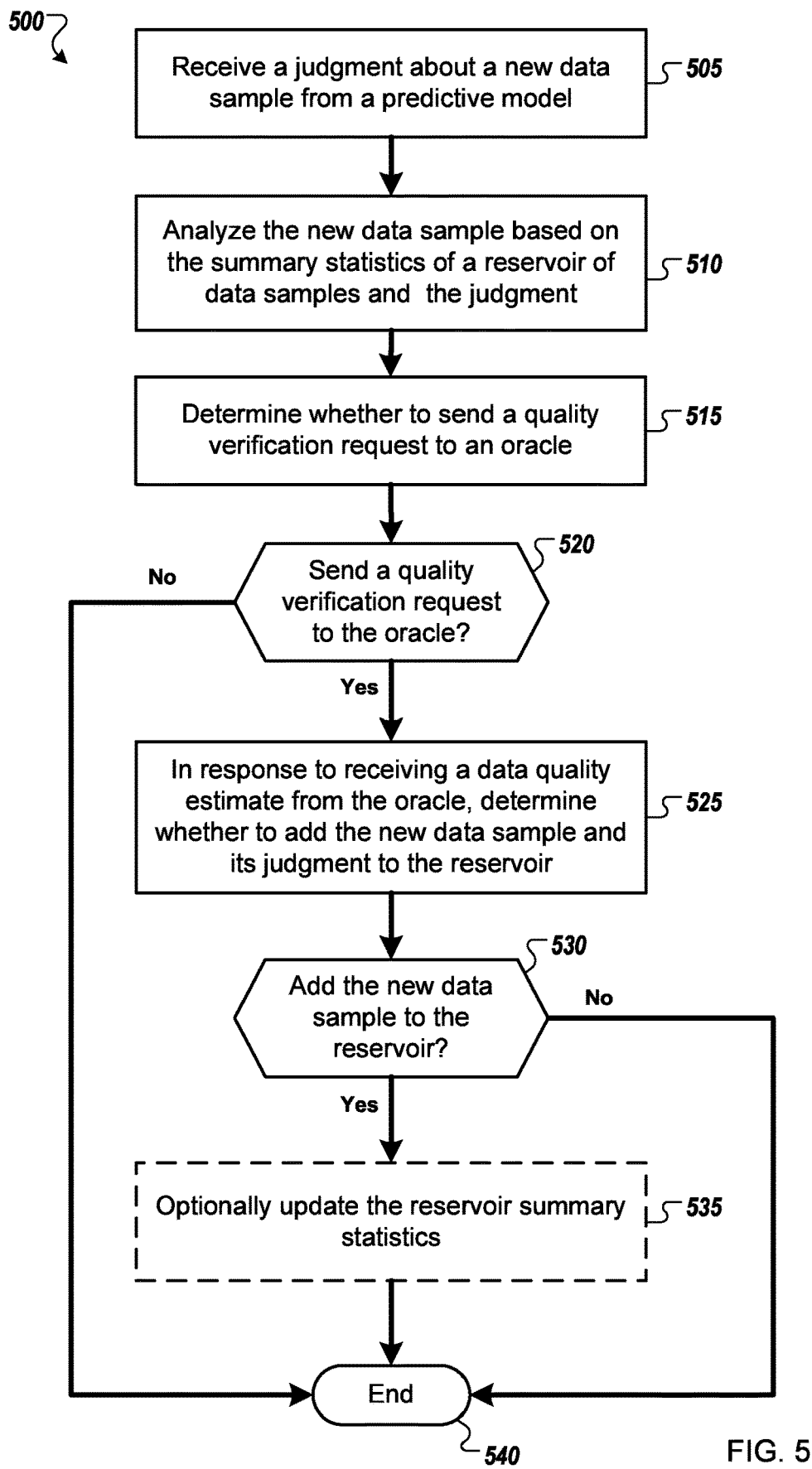
Figure 6:
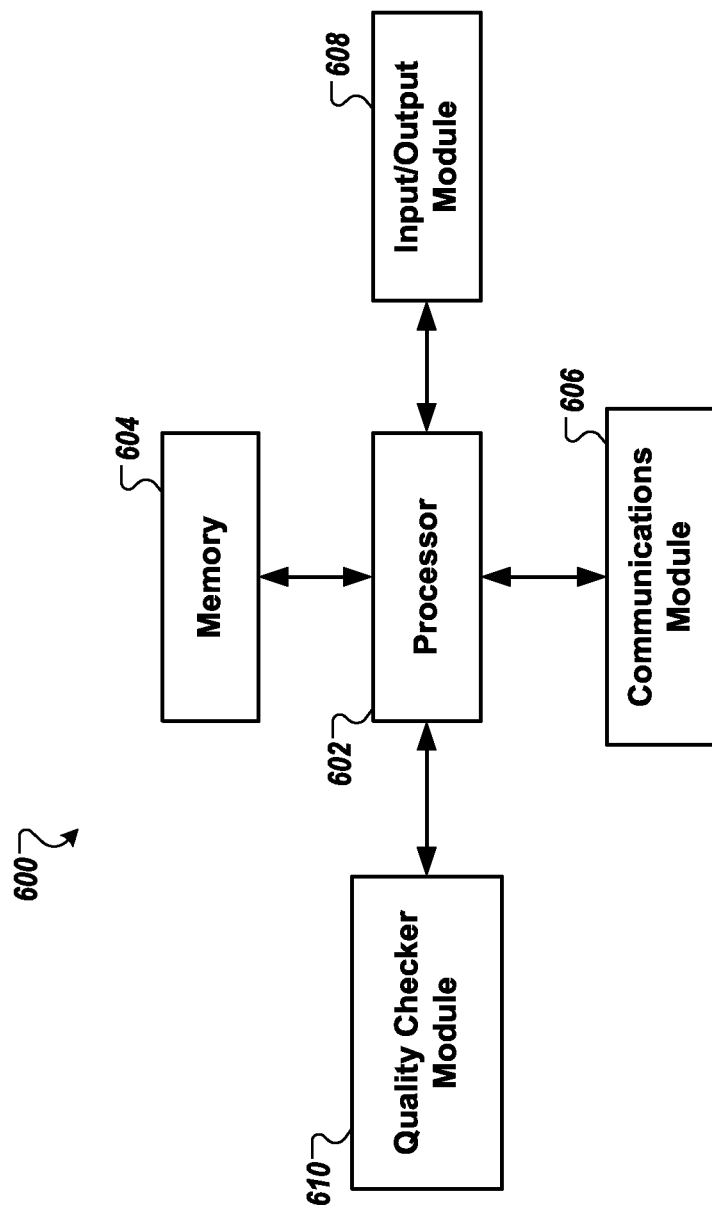

FIG. 5 is a flow diagram of an example method for automatic dynamic data quality assessment of dynamic input data being analyzed using an adaptive predictive model in accordance with some embodiments discussed herein; and FIG. 6 illustrates a schematic block diagram of circuitry that can be included in a computing device, such as a dynamic data quality assessment device, in accordance with some embodiments discussed herein.

DETAILED DESCRIPTION

The present invention now will be described more fully hereinafter with reference to the accompanying drawings, in which some, but not all embodiments of the invention are shown. Indeed, the invention may be embodied in many different forms and should not be construed as being limited to the embodiments set forth herein; rather, these embodiments are provided so that this disclosure will satisfy applicable legal requirements. Like numbers refer to like elements throughout.

As described herein, system components can be communicatively coupled to one or more of each other. Though the components are described as being separate or distinct, two or more of the components may be combined into a single process or routine. The component functional descriptions provided herein including separation of responsibility for distinct functions is by way of example. Other groupings or other divisions of functional responsibilities can be made as necessary or in accordance with design preferences.

As used herein, the terms "data," "content," "information" and similar terms may be used interchangeably to refer to data capable of being captured, transmitted, received, displayed and/or stored in accordance with various example embodiments. Thus, use of any such terms should not be taken to limit the spirit and scope of the disclosure. Further, where a computing device is described herein to receive data from another computing device, the data may be received directly from the another computing device or may be received indirectly via one or more intermediary computing devices, such as, for example, one or more servers, relays, routers, network access points, base stations, and/or the like. Similarly, where a computing device is described herein to send data to another computing device, the data may be sent directly to the another computing device or may be sent indirectly via one or more intermediary computing devices, such as, for example, one or more servers, relays, routers, network access points, base stations, and/or the like.

A system that automatically identifies new businesses based on data sampled from a data stream representing data collected from a variety of online sources (e.g., websites, blogs, and social media) is an example of a system that processes dynamic data. Analysis of such dynamic data typically is based on data-driven statistical models that depend on consistent data quality, yet dynamic data is inherently inconsistent in its quality. The quality of the data sources may vary, the quality of the data collection methods may vary, and, in the case of data being collected continuously from a data stream, the overall quality and statistical distribution of the data itself may vary over time. Data quality fluctuations may affect the performance of the statistical models, and, in some cases when the data quality and/or statistical distribution of the data has changed over time, the statistical models may have to be replaced by different models that more closely fit the changed data. Thus, it is important to be able to perform data quality assessments on dynamic data as it is being collected, so that the quality fluctuations and statistical distribution of the data may be monitored.

As such, and according to some example embodiments, the systems and methods described herein are therefore configured to implement dynamic data quality assessment. In embodiments, a system maintains one or more data reservoirs of previously assessed data samples and their respective associated quality assessments. When the system receives a new data sample, the system determines whether the new data sample statistically belongs in a data reservoir of data samples having the same data type as the new data sample, and the system may determine that the new data sample should be added to the data reservoir. The system may send a quality verification request for the new data sample to a source of truth (oracle, hereinafter) and, in response to receiving a quality estimate of the new data sample from the oracle, may add the new data sample to the data reservoir.

In some embodiments, the system may store summary statistics for the data reservoir; those summary statistics represent a current snapshot of the quality of the data samples being collected. In embodiments, the system may store instances of reservoir summary statistics, and may use those summary statistics in analyses to determine quality fluctuations and other time-based trends representative of the data being collected and of the data sources from which the data are being collected. In some embodiments, the system may compare the reservoir summary statistics to summary statistics calculated from a corpus of data in order to determine overall quality of the data samples currently being collected.

In some embodiments, a dynamic data quality assessment system may be a component of an adaptive data analysis system that processes dynamic data using predictive models developed using machine learning algorithms. By repeatedly making assessments of data quality and statistical distribution of the data samples as they are being collected, the dynamic data quality assessment system may provide feedback for modifying training data sets and/or feature extraction to enable incremental adaptations of predictive models to fit the dynamic data. Incrementally adapting an existing model is less disruptive and resource-intensive than replacing the model with a new model, and also enables a model to evolve with the dynamic data.

Figure 1:
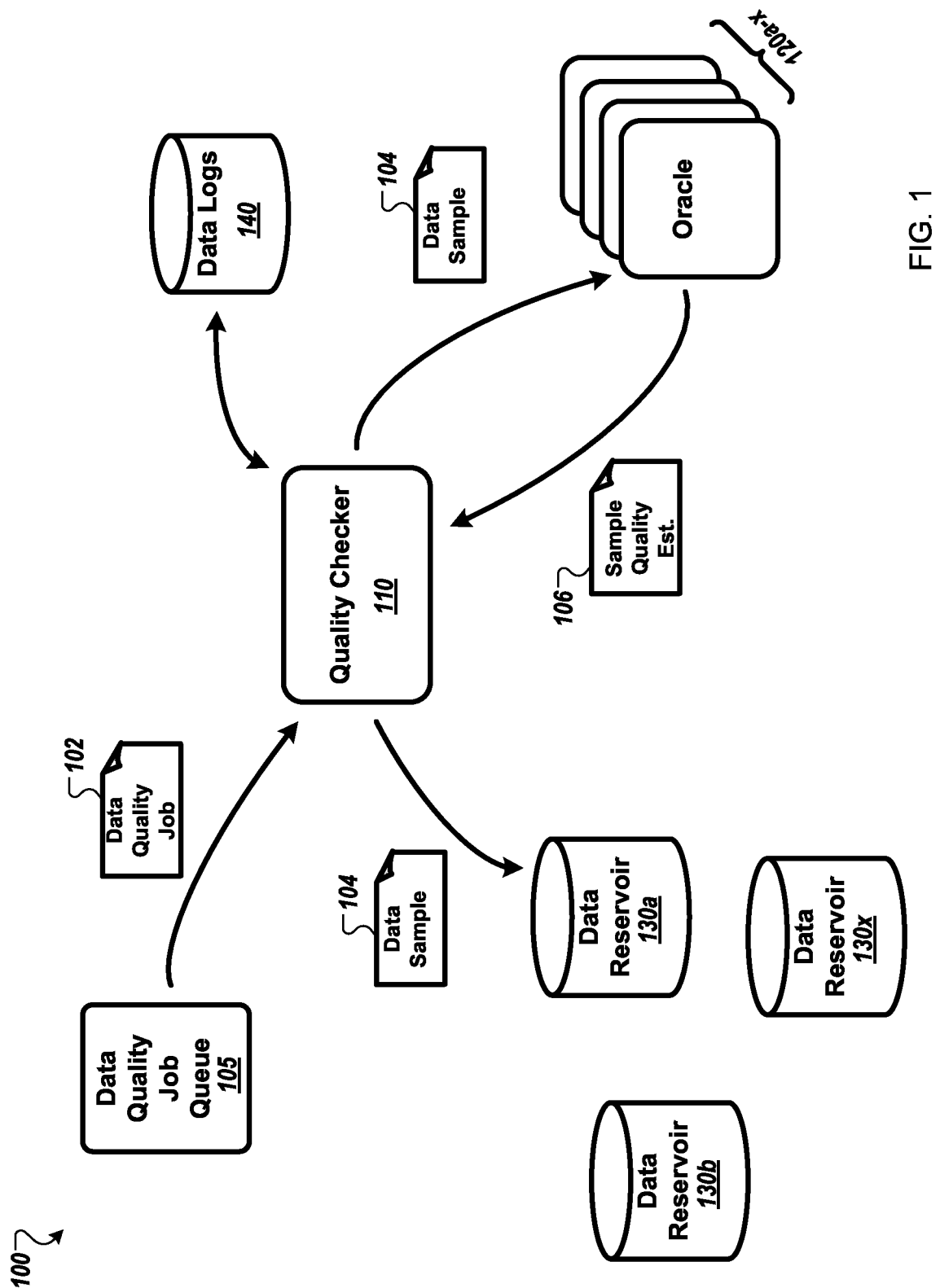
FIG. 1 illustrates an example system that can be configured to implement dynamic data quality assessment in accordance with some embodiments discussed herein.

FIG. 1 illustrates an example system 100 that can be configured to implement dynamic data quality assessment according to various embodiments of the invention. In embodiments, system 100 may comprise a quality checker 110 for assessing the quality of a particular data sample; one or more sources of truth (oracles, hereinafter) (120a-120x) for providing a verified quality measure for a received data sample; one or more data reservoirs 130a-130x maintained by quality checker 110, each reservoir respectively storing a group of previously assessed data samples; and one or more persistently stored data logs accessed by quality checker 110, each log including metadata collected by the quality checker 110 during the assessment of a set of received data samples.

In some embodiments, quality checker 110 receives a data quality job 102 from a data quality job queue 105. In some embodiments, the data quality job 102 includes a new data sample 104 and configuration data that includes one or more of the type of data to be assessed (e.g., a merchant contact information record that includes the address, phone number, and website URL of a merchant), a method for verifying the type of data, and an oracle identifier that indicates a particular oracle to provide a verified quality measure for the data sample 104.

In some embodiments, a new data sample 104 may have been processed by a cleaning processor prior to being included in a data quality job 102. Examples of data cleaning processing include applying one or more of auto-normalization of the new data sample, sending the new data sample to a crowd for completion and/or correction, geo-coding the new data sample (i.e., generating a normalized address and/or the latitude and longitude of a location included in the new data sample), and creating an optimized view of the new data sample by consolidating data features of the collected data.

In some embodiments, a data quality job 102 may be a streaming data quality job for processing a new data sample 104 that has been collected from a data stream. The streaming new data sample 104 may represent a single data instance collected from the data stream or, alternatively, the streaming data sample 104 may represent a set of data instances collected from the data stream within a pre-defined time window (e.g., data collected from the data stream during a day or data collected from the data stream during a week).

In some embodiments, further processing of a data quality job 102 is based at least in part on determining whether to assess the quality of the new data sample 104. In some embodiments, determining whether to assess the quality of the new data sample 104 is based in part on determining whether to add the data sample 104 to a data reservoir 130 in which are stored previously assessed data samples, each stored data sample having the same data sample type as the new data sample 104.

In some embodiments, determining whether to add the new data sample 104 to the data reservoir 130 is based on at least the value of at least one of the attributes of the new data sample 104 (e.g., country of origin or language if the data sample is a merchant contact information record). Additionally and/or alternatively, in some embodiments, determining whether to add the new data sample 104 to the data reservoir 130 is based on a probabilistic sampling approach. For a data reservoir 130 that includes a pre-defined number N of stored data samples (e.g., N=400 data samples), the probability of adding the new data sample 104 is 1/N given N−1 prior observed events. To maintain the constant N data samples, adding a new data sample to a reservoir 130 includes replacing a data sample that is currently stored in the reservoir 130. The selection of the data sample being replaced is done randomly.

In some embodiments, assessing the quality of a new data sample 104 includes sending the new data sample 104 with a quality verification request to an oracle 120. In some embodiments, the oracle to be sent the request is specified in configuration data included in the data quality job 102. In some embodiments, quality checker 110 may be configured to send requests to any of a group of different oracles 120a-120x (e.g., a crowd, a flat file of data verification results previously received from one or more oracles, and/or data verification software). In some embodiments, the quality verification request is sent to the oracle 120 asynchronously, and the oracle returns a quality estimate 106 of the data sample 104 when processing of the quality verification request completes. In some embodiments, the quality estimate 106 returned by the oracle 120 may be a quality score that is calculated based on percentages of correctness and completeness of the data sample 104.

In some embodiments, quality checker 110 updates the data reservoir 130 summary statistics in response to adding a new data sample 104 and its associated quality estimate 106 to the data reservoir 130. Additionally and/or alternatively, in some embodiments, the system may update the data reservoir 130 summary statistics after a set of new data samples have been added, after an external event that may affect the overall quality of the data samples (e.g., the status of a data source that supplies the new data samples has changed, the status of the oracle providing the data quality estimates has changed), and/or after a particular period of time has elapsed since the last reservoir summary statistics update was made. The updated summary statistics are calculated using the stored samples (and their associated quality estimates) in the data reservoir 130, and thus represent a current snapshot of the quality of collected data having a particular data sample type.

In some embodiments, the updated summary statistics are added to persistently stored data logs 140. In some embodiments, the persistently stored data logs 140 may be accessed and used in analyses for determining changes of data quality over time and/or making judgments about overall quality of data that are being collected. In some embodiments, the system may receive summary statistics for a corpus of data samples, each corpus data sample having the same data sample type as the data samples in the reservoir 130. The corpus summary statistics may be used as a global data quality baseline, and an analysis may include comparing the summary statistics of the reservoir 130 with the summary statistics of the corpus. Alternatively, in some embodiments, the system may access the corpus of data samples directly and calculate the corpus summary statistics in the same way that the updated reservoir summary statistics were calculated prior to comparing the reservoir summary statistics and the corpus summary statistics.

Figure 2:
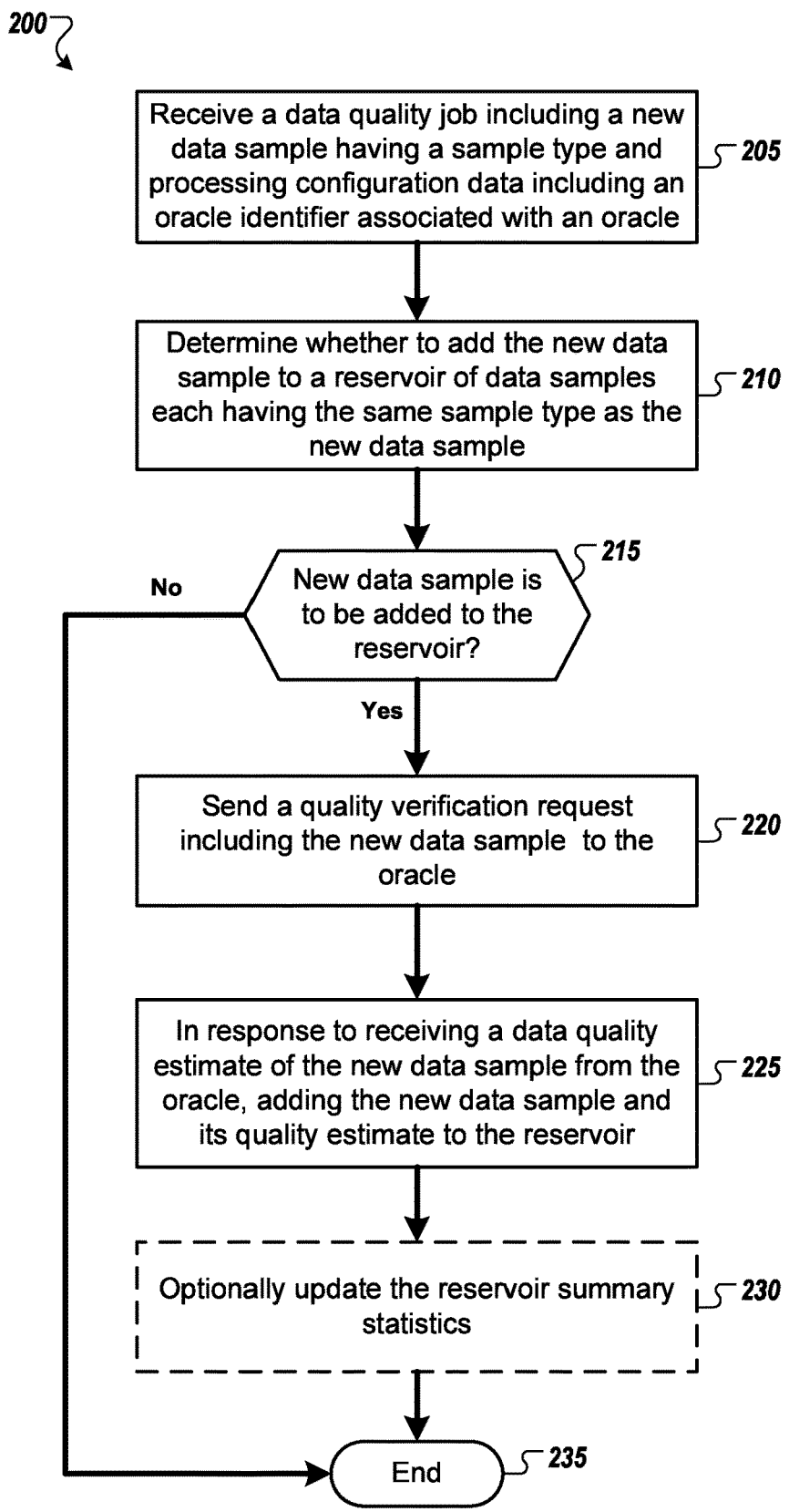
FIG. 2 is a flow diagram of an example method for automatic dynamic data quality assessment in accordance with some embodiments discussed herein.

FIG. 2 is a flow diagram of an example method 200 for automatic dynamic data quality assessment. For convenience, the method 200 will be described with respect to a system that includes one or more computing devices and performs the method 200. Specifically, the method 200 will be described with respect to processing a data quality job 102 by quality checker 110 in dynamic quality assessment system 100.

In embodiments, the system receives 205 a data quality job 102 for quality assessment processing of a new data sample 104 having a particular data sample type. The data quality job 102 includes configuration data which may include one or more of the type of data to be assessed, a method for verifying the type of data, and an oracle identifier that indicates a particular oracle to provide a verified quality measure for the data sample 104. As previously described with reference to FIG. 1, the new data sample 104 may have been collected from a data stream, and/or may have been pre-processed by a data cleaning process.

In embodiments, the system determines 210 whether to add the new data sample 104 to a reservoir of data samples that were previously assessed for quality, each of the data samples having the same data sample type as the data sample type of the new data sample 104. As previously described with reference to FIG. 1, determining whether to add the new data sample 104 to the data reservoir is based on determining 210 whether the new data sample 104 statistically belongs in the data reservoir.

In an instance in which the system determines 215 that the new data sample 104 is not to be added to the reservoir, the process ends 235.

In an instance in which the system determines 215 that the new data sample 104 is to be added to the reservoir, the system sends 220 the new data sample 104 and a quality verification request to an oracle in order to receive a verified data quality estimate for the new data sample 104. As previously described with reference to FIG. 1, the system may be configured to send quality verification requests to any of a group of different oracles 120a-120x, and the system chooses a particular oracle 120 from the group of oracles to receive the quality verification request. In some embodiments, the choice of the particular oracle 120 to receive the quality verification request is based on configuration data included in the data quality job 102 and/or the data type of the new data sample 102.

In some embodiments, the quality verification request is sent to the oracle 120 as an asynchronous request. In some embodiments, the oracle 120 returns a pending request identifier to the system as an acknowledgement to receiving the quality verification request, and the system stores the new data sample and its associated pending request identifier until the system receives the verified data quality estimate 106 result from the oracle 120. Thus, the system maintains a log of data quality jobs in which a new data sample has been selected by the system for quality assessment but for which processing has been suspended to await verification results that are returned from an oracle.

In response to receiving a data quality estimate 106 of the new data sample 104 from the oracle 120, in embodiments, the system adds 225 the new data sample 104 and its associated data quality estimate 106 to the data reservoir 130. As previously described with reference to FIG. 1, in some embodiments, the system may maintain the data reservoir 130 at a constant size of N data samples. Thus, to maintain the data reservoir size of N data samples, a currently stored data sample is removed from the data reservoir 130 when a new data sample 104 is added.

In embodiments, before the process ends 235, the system optionally updates 230 summary statistics for the reservoir 130. As previously described with reference to FIG. 1, the system may update the reservoir summary statistics in response to adding the new data sample 104 to the reservoir and/or may update the reservoir summary statistics in response to another internal or external event. In some embodiments, updating the reservoir summary statistics may include calculating an overall data quality estimate for the reservoir 130 using the data quality estimates respectively associated with each of the data samples in the reservoir and/or calculating a statistical variance for the data samples in the reservoir 130.

In some embodiments, automated dynamic data quality assessment is used to ensure that a predictive model for analyzing dynamic input data (e.g., data that originates from a variety of sources and is collected continuously from a data stream) can adapt to the dynamic nature of the data and thus maintain consistent and reliable predictions. For example, in embodiments, data describing information about businesses may be collected from a variety of online sources (e.g., websites, blogs), each business may be categorized (e.g., is this a restaurant?) based on the collected data using a predictive model (e.g., a classifier), and the results may be stored in a business search index as described, for example, in U.S. patent application Ser. No. 13/797,570 entitled "Discovery of New Business Openings Using Web Content Analysis," filed on Mar. 12, 2013, and which is incorporated herein in its entirety. In some embodiments, the predictive model is a data-driven statistical model that is generated from a training data set of previously processed data samples using machine learning (e.g., the predictive model is a trainable classifier having coefficients that are adapted based on a training data set using a supervised learning scheme, as described, for example, in U.S. patent application Ser. No. 13/797,570).

Figure 3:
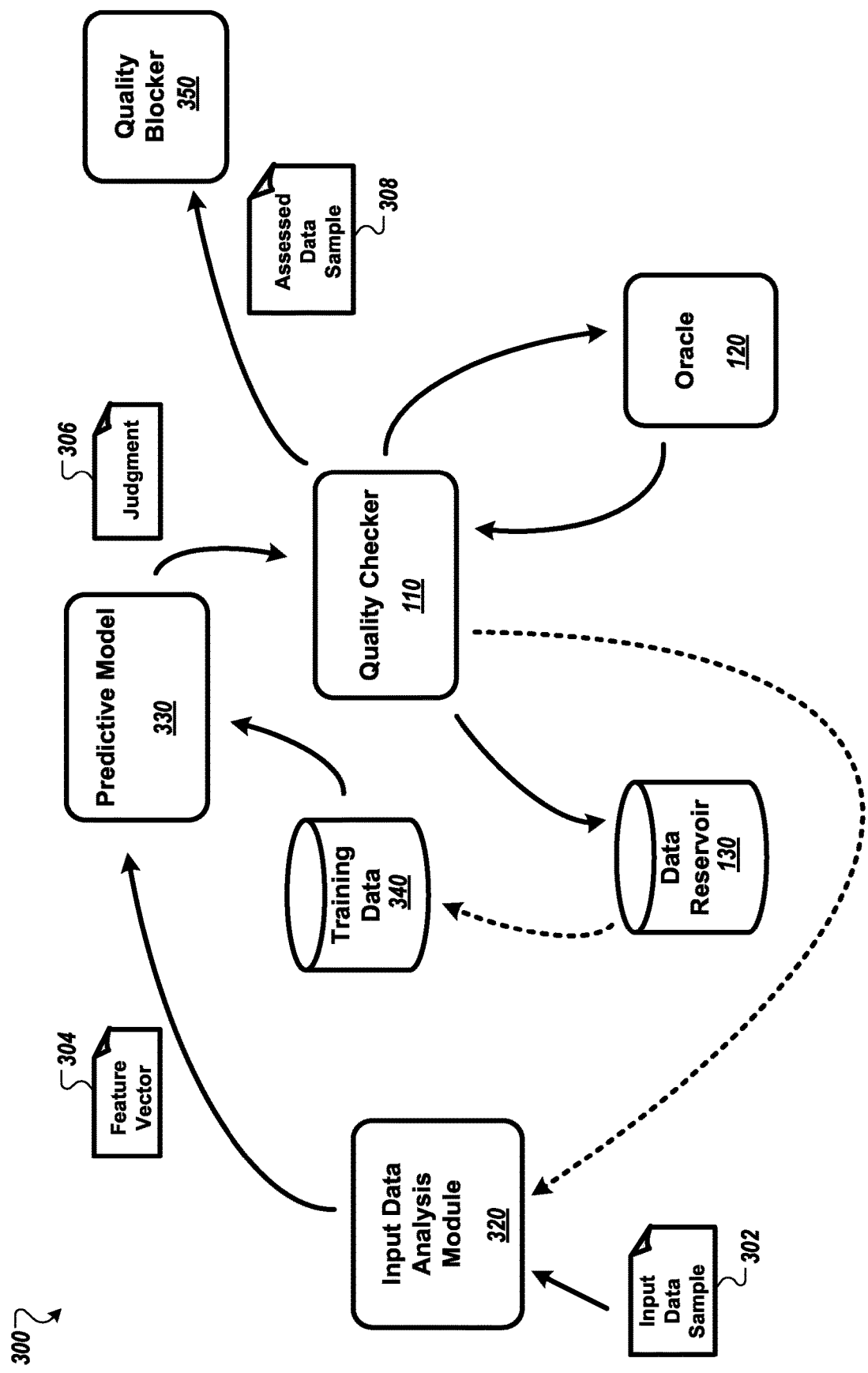
FIG. 3 illustrates an example adaptive data analysis system that is configured to include dynamic data quality assessment in accordance with some embodiments discussed herein.

FIG. 3 illustrates an example adaptive data analysis system 300 that is configured to include dynamic data quality assessment according to various embodiments of the invention. In embodiments, system 300 may comprise an input data analysis module 320 for creating an optimal feature representation (e.g., a feature vector 304) of a received input data sample 302; a predictive model 330 that has been generated using machine learning based on a set of training data 340, and that is configured to generate a judgment 306 about the input data sample 302 in response to receiving a feature vector 304 representing the input data sample 302; a quality checker 110 for assessing the quality of the input data sample 302 and its associated judgment 306; at least one oracle 120 for providing a verified quality measure for the input data sample 302 and its associated judgment 306; a data reservoir 130 maintained by quality checker 110 to store a group of input data samples and their respective judgments previously assessed by quality checker 110; and a quality blocker 350 that determines whether the quality of the assessed input data sample 308 is above an acceptable quality threshold.

In some embodiments, for example, a dynamic data quality assessment system, such as system 100, is used within an adaptive data analysis system 300 to assess the quality of input data collected from a data stream, determine the effect of data quality fluctuations on the performance of a predictive model generated from a training data set 340 using machine learning, identify input data samples that currently best represent examples of the modeled data, and modify the training data 340 set to enable the model to be improved incrementally by being re-trained with a currently optimal set of examples.

In some embodiments, the predictive model generates a judgment based on a feature vector 304 that represents an optimal view of the input data sample 302 and that is generated by an input data analysis module 320. In some embodiments, the feature vector 304 is generated as a result of statistical analysis (e.g., cluster analysis as described, for example, in U.S. patent application Ser. No. 14/038,661 entitled "Dynamic Clustering for Streaming Data," filed on Sep. 26, 2013, and which is incorporated herein in its entirety) by an input data analysis module 320. In some embodiments, the dynamic data quality assessment system may provide feedback to an input data analysis module 320 that, due to the dynamic nature of the input data samples, the feature vectors currently being generated by the input data analysis module 320 no longer represent optimal views of the input data samples. Less than optimal views of the input data may affect performance of the predictive model.

In some embodiments, an adaptive data analysis system 300 may be configured to further include an active learning component to facilitate adaptation of the predictive model. Active learning, as described, for example, in Settles, Burr (2009), "Active Learning Literature Survey", Computer Sciences Technical Report 1648. University of Wisconsin—Madison, is semi-supervised learning, in which the distribution of samples composing a training data set can be adjusted to optimally represent a machine learning problem by interactively querying a source of truth (e.g., an oracle) to assign labels to new data samples that are to be added to the training data set. In embodiments, a dynamic data quality assessment system may complement an active learning component to ensure that any modifications of the training data by adding new samples to the training data set do not result in over-fitting the model to the problem.

Figure 4:
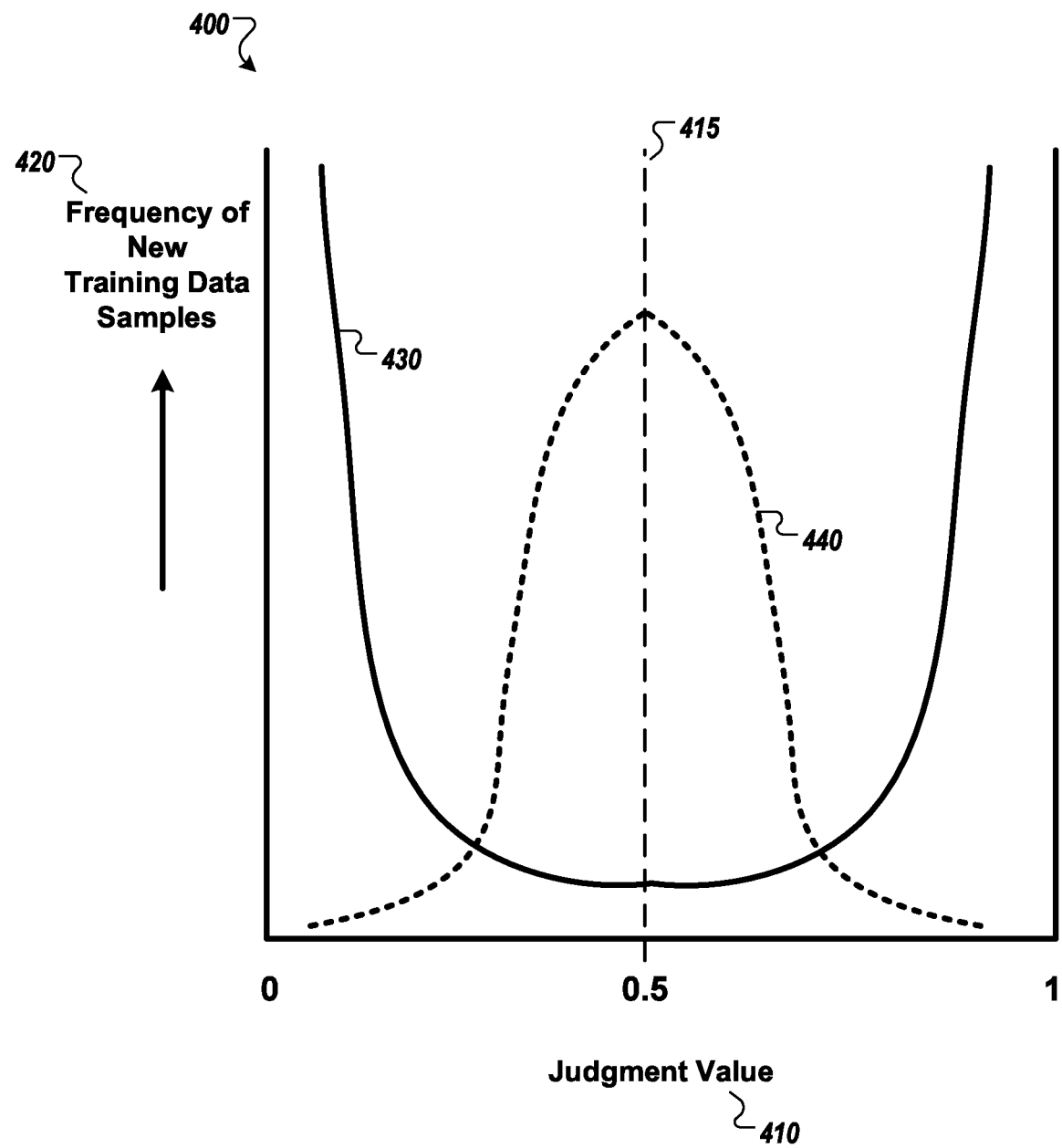
FIG. 4 is an illustration of the different effects of active learning and dynamic data quality assessment on selection of new data samples to be added to an exemplary training data set for a binary classification model in accordance with some embodiments discussed herein.

FIG. 4 is an illustration of the different effects of active learning and dynamic data quality assessment on selection of new data samples to be added to an exemplary training data set for a binary classification model. A model (i.e., a classifier) assigns a judgment value 410 to each data point; a data point assigned a judgment value that is close to either 0 or 1 has been determined with certainty by the classifier to belong to one or the other of the classes. A judgment value of 0.5 represents a situation in which the classification decision was not certain; an input data sample assigned a judgment value close to 0.5 by the classifier represents a judgment that is close to the decision boundary 415 for the classification task.

The dashed curve 440 represents the relative frequencies of new training data samples that would be added to a training data set for this binary classification problem by an active learning component. To enhance the performance of the classifier in situations where the decision was uncertain, the active learning component would choose the majority of new training data samples from input data that resulted in decisions near the decision boundary 415.

The solid curve 430 represents the relative frequencies of new training data samples that would be added to the training data set by dynamic quality assessment. Instead of choosing new training data samples based on the judgment value, in some embodiments, dynamic quality assessment may choose the majority of new training data samples based on whether they statistically belong in the reservoir. It also may choose to add new training data samples that were classified with certainty (i.e., having a judgment value close to either 0 or 1), but erroneously (e.g., samples in which the judgment result from the classifier did not match the result returned from the oracle).

FIG. 5 is a flow diagram of an example method 500 for automatic dynamic data quality assessment of dynamic input data being analyzed using an adaptive predictive model. For convenience, the method 500 will be described with respect to a system that includes one or more computing devices and performs the method 500. Specifically, the method 500 will be described with respect to processing an input data sample 302 and its associated judgment 306 from a predictive model 330 by quality checker 110 in adaptive data analysis system 300.

For clarity and without limitation, method 500 will be described for a scenario in which the input data sample 302 is a sample of data collected from a data stream, and in which the predictive model 330 is a trainable classifier, adapted based on a set of training data 340. The classifier 330 is configured to receive a feature vector 304 representing a view of the input data sample 302 and to output a judgment 306 about the input data sample 302.

In embodiments, the system receives 505 a judgment 306 about an input data sample 302 from a classifier. In some embodiments, the judgment includes a confidence value that represents a certainty of the judgment 306. For example, in some embodiments, the confidence value may be a score that represents the distance of the judgment from the decision boundary in decision space for the particular classification problem modeled by the classifier. The confidence score is higher (i.e., the judgment is more certain) for judgments that are further from the decision boundary.

As previously described with reference to FIG. 1, in some embodiments, the system maintains a data reservoir 130 of data samples that have the same data type as the input data sample 302 and that have been processed previously by the classifier 330. In embodiments, the system analyzes 510 the input data sample 302 in terms of the summary statistics of the data reservoir and/or the judgment 306. In some embodiments, analysis of the judgment 306 may include comparing a confidence value associated with the judgment to a confidence threshold and/or determining whether the judgment 306 matches a judgment determined previously for the input sample by a method other than the classifier.

In embodiments, the system determines 515 whether to send a quality verification request for the input data sample to an oracle 120 based on the analysis. For example, in some embodiments, the system may determine to send a quality verification request for the input data sample if the data sample is determined statistically to be an outlier to the data samples in the data reservoir. In another example, the system may determine to send a quality verification request for the input data sample if the judgment is associated with a confidence value that is below a confidence threshold. In a third example, the system may determine to send a quality verification request for the input data sample if the judgment generated by the classifier does not match a judgment generated by another method, even if the confidence value associated with the classifier's judgment is above the confidence threshold.

In an instance in which the system determines 520 that a quality request will not be sent to the oracle, the process ends 540.

In an instance in which the system determines 520 that a quality request will be sent to the oracle, in some embodiments, as previously described with reference to FIG. 1, the system may be configured to send requests to any of a group of different oracles (e.g., a crowd, a flat file of data verification results previously received from one or more oracles, and/or data verification software) and the system may select the oracle to receive the quality verification request based on attributes of the input data sample 302.

In response to receiving a data quality estimate of the input data sample 302 from the oracle 120, in embodiments, the system determines 525 whether to add the input data sample, its associated judgment, and its data quality estimate to the data reservoir. In some embodiments, the determination may be based on whether the input data sample 302 statistically belongs in the data reservoir, as described previously with reference to FIG. 2. Additionally and/or alternatively, the determination may be based on whether the judgment 306 is associated with a high confidence value and/or matches a judgment made by a method different from the classifier (e.g., the oracle).

In an instance in which the system determines 525 that the new data sample 302 is not to be added to the reservoir, the process ends 540.

In an instance in which the system determines 525 that the new data sample 302 is to be added to the reservoir, before the process ends 540, the system optionally updates 230 summary statistics for the reservoir 130 as previously described with reference to FIG. 2.

FIG. 6 shows a schematic block diagram of circuitry 600, some or all of which may be included in, for example, dynamic data quality assessment system 100. As illustrated in FIG. 6, in accordance with some example embodiments, circuitry 600 can include various means, such as processor 602, memory 604, communications module 606, and/or input/output module 608. As referred to herein, "module" includes hardware, software and/or firmware configured to perform one or more particular functions. In this regard, the means of circuitry 600 as described herein may be embodied as, for example, circuitry, hardware elements (e.g., a suitably programmed processor, combinational logic circuit, and/or the like), a computer program product comprising computer-readable program instructions stored on a non-transitory computer-readable medium (e.g., memory 604) that is executable by a suitably configured processing device (e.g., processor 602), or some combination thereof.

Processor 602 may, for example, be embodied as various means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), or some combination thereof. Accordingly, although illustrated in FIG. 6 as a single processor, in some embodiments processor 602 comprises a plurality of processors. The plurality of processors may be embodied on a single computing device or may be distributed across a plurality of computing devices collectively configured to function as circuitry 600. The plurality of processors may be in operative communication with each other and may be collectively configured to perform one or more functionalities of circuitry 600 as described herein. In an example embodiment, processor 602 is configured to execute instructions stored in memory 604 or otherwise accessible to processor 602. These instructions, when executed by processor 602, may cause circuitry 600 to perform one or more of the functionalities of circuitry 600 as described herein.

Whether configured by hardware, firmware/software methods, or by a combination thereof, processor 602 may comprise an entity capable of performing operations according to embodiments of the present invention while configured accordingly. Thus, for example, when processor 602 is embodied as an ASIC, FPGA or the like, processor 602 may comprise specifically configured hardware for conducting one or more operations described herein. Alternatively, as another example, when processor 602 is embodied as an executor of instructions, such as may be stored in memory 604, the instructions may specifically configure processor 602 to perform one or more algorithms and operations described herein, such as those discussed in connection with FIGS. 1-2, FIG. 3, and FIG. 5.

Memory 604 may comprise, for example, volatile memory, non-volatile memory, or some combination thereof. Although illustrated in FIG. 6 as a single memory, memory 604 may comprise a plurality of memory components. The plurality of memory components may be embodied on a single computing device or distributed across a plurality of computing devices. In various embodiments, memory 604 may comprise, for example, a hard disk, random access memory, cache memory, flash memory, a compact disc read only memory (CD-ROM), digital versatile disc read only memory (DVD-ROM), an optical disc, circuitry configured to store information, or some combination thereof. Memory 604 may be configured to store information, data (including analytics data), applications, instructions, or the like for enabling circuitry 600 to carry out various functions in accordance with example embodiments of the present invention. For example, in at least some embodiments, memory 604 is configured to buffer input data for processing by processor 602. Additionally or alternatively, in at least some embodiments, memory 604 is configured to store program instructions for execution by processor 602. Memory 604 may store information in the form of static and/or dynamic information. This stored information may be stored and/or used by circuitry 600 during the course of performing its functionalities.

Communications module 606 may be embodied as any device or means embodied in circuitry, hardware, a computer program product comprising computer readable program instructions stored on a computer readable medium (e.g., memory 604) and executed by a processing device (e.g., processor 602), or a combination thereof that is configured to receive and/or transmit data from/to another device, such as, for example, a second circuitry 600 and/or the like. In some embodiments, communications module 606 (like other components discussed herein) can be at least partially embodied as or otherwise controlled by processor 602. In this regard, communications module 606 may be in communication with processor 602, such as via a bus. Communications module 606 may include, for example, an antenna, a transmitter, a receiver, a transceiver, network interface card and/or supporting hardware and/or firmware/software for enabling communications with another computing device.

Communications module 606 may be configured to receive and/or transmit any data that may be stored by memory 604 using any protocol that may be used for communications between computing devices. Communications module 606 may additionally or alternatively be in communication with the memory 604, input/output module 608 and/or any other component of circuitry 600, such as via a bus.

Input/output module 608 may be in communication with processor 602 to receive an indication of a user input and/or to provide an audible, visual, mechanical, or other output to a user. Some example visual outputs that may be provided to a user by circuitry 600 are discussed in connection with FIG. 1 and FIG. 3. As such, input/output module 608 may include support, for example, for a keyboard, a mouse, a joystick, a display, a touch screen display, a microphone, a speaker, a RFID reader, barcode reader, biometric scanner, and/or other input/output mechanisms. In embodiments wherein circuitry 600 is embodied as a server or database, aspects of input/output module 608 may be reduced as compared to embodiments where circuitry 600 is implemented as an end-user machine or other type of device designed for complex user interactions. In some embodiments (like other components discussed herein), input/output module 608 may even be eliminated from circuitry 600. Alternatively, such as in embodiments wherein circuitry 600 is embodied as a server or database, at least some aspects of input/output module 608 may be embodied on an apparatus used by a user that is in communication with circuitry 600, such as for example, pharmacy terminal 108. Input/output module 608 may be in communication with the memory 604, communications module 606, and/or any other component(s), such as via a bus. Although more than one input/output module and/or other component can be included in circuitry 600, only one is shown in FIG. 6 to avoid overcomplicating the drawing (like the other components discussed herein).

Quality checker module 610 may also or instead be included and configured to perform the functionality discussed herein related to the dynamic data quality assessment discussed above. In some embodiments, some or all of the functionality of dynamic data quality assessment may be performed by processor 602. In this regard, the example processes and algorithms discussed herein can be performed by at least one processor 602 and/or quality checker module 610. For example, non-transitory computer readable media can be configured to store firmware, one or more application programs, and/or other software, which include instructions and other computer-readable program code portions that can be executed to control each processor (e.g., processor 602 and/or quality checker module 610) of the components of system 400 to implement various operations, including the examples shown above. As such, a series of computer-readable program code portions are embodied in one or more computer program products and can be used, with a computing device, server, and/or other programmable apparatus, to produce machine-implemented processes.

Any such computer program instructions and/or other type of code may be loaded onto a computer, processor or other programmable apparatus's circuitry to produce a machine, such that the computer, processor other programmable circuitry that execute the code on the machine create the means for implementing various functions, including those described herein.

It is also noted that all or some of the information presented by the example displays discussed herein can be based on data that is received, generated and/or maintained by one or more components of dynamic data quality assessment system 100. In some embodiments, one or more external systems (such as a remote cloud computing and/or data storage system) may also be leveraged to provide at least some of the functionality discussed herein.

As described above in this disclosure, aspects of embodiments of the present invention may be configured as methods, mobile devices, backend network devices, and the like. Accordingly, embodiments may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Any suitable computer-readable storage medium may be utilized including non-transitory hard disks, CD-ROMs, flash memory, optical storage devices, or magnetic storage devices.

Embodiments of the present invention have been described above with reference to block diagrams and flowchart illustrations of methods, apparatuses, systems and computer program products. It will be understood that each block of the circuit diagrams and process flow diagrams, and combinations of blocks in the circuit diagrams and process flowcharts, respectively, can be implemented by various means including computer program instructions. These computer program instructions may be loaded onto a general purpose computer, special purpose computer, or other programmable data processing apparatus, such as processor 602 and/or quality checker module 610 discussed above with reference to FIG. 6, to produce a machine, such that the computer program product includes the instructions which execute on the computer or other programmable data processing apparatus create a means for implementing the functions specified in the flowchart block or blocks.

These computer program instructions may also be stored in a computer-readable storage device (e.g., memory 604) that can direct a computer or other programmable data processing apparatus to function in a particular manner, such that the instructions stored in the computer-readable storage device produce an article of manufacture including computer-readable instructions for implementing the function discussed herein. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions discussed herein.

Accordingly, blocks of the block diagrams and flowchart illustrations support combinations of means for performing the specified functions, combinations of steps for performing the specified functions and program instruction means for performing the specified functions. It will also be understood that each block of the circuit diagrams and process flowcharts, and combinations of blocks in the circuit diagrams and process flowcharts, can be implemented by special purpose hardware-based computer systems that perform the specified functions or steps, or combinations of special purpose hardware and computer instructions Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A system, comprising one or more computers and one or more storage devices storing instructions that are operable, when executed by the one or more computers, to cause the one or more computers to:
   determine whether to add a data sample associated with a machine learning model to a reservoir of data samples based at least in part on configuration data associated with the data sample;
   in an instance in which the data sample is to be added to the reservoir of data samples, select an oracle of a plurality of oracles based at least in part on the configuration data; and
   send the data sample to the oracle, the oracle configured to add the data sample to the reservoir of data samples based on a data quality estimate associated with the data sample.

2. The system of claim 1, wherein the one or more storage devices store instructions that are operable, when executed by the one or more computers, to further cause the one or more computers to:
   select the oracle based at least in part on one or more of types of data associated with the data sample.

3. The system of claim 1, wherein the one or more storage devices store instructions that are operable, when executed by the one or more computers, to further cause the one or more computers to:
   select the oracle based at least in part on one or more attributes associated with the data sample.

4. The system of claim 1, wherein the one or more storage devices store instructions that are operable, when executed by the one or more computers, to further cause the one or more computers to:
   select the oracle based at least in part on an oracle identifier included in the configuration data.

5. The system of claim 1, wherein the one or more storage devices store instructions that are operable, when executed by the one or more computers, to further cause the one or more computers to:
   select the oracle based at least in part on a verified quality measure for the data sample.

6. The system of claim 1, wherein the one or more storage devices store instructions that are operable, when executed by the one or more computers, to further cause the one or more computers to:
   obtain the configuration data from a data stream associated with the data sample.

7. The system of claim 1, wherein the one or more storage devices store instructions that are operable, when executed by the one or more computers, to further cause the one or more computers to:
   obtain the configuration data from a data queue configured to store the data sample and the configuration data.

8. A computer-implemented method, comprising:
   determining, by a computing device comprising a processor, whether to add a data sample associated with a machine learning model to a reservoir of data samples based at least in part on configuration data associated with the data sample;
   in an instance in which the data sample is to be added to the reservoir of data samples, selecting, by the computing device, an oracle of a plurality of oracles based at least in part on the configuration data; and
   sending, by the computing device, the data sample to the oracle, the oracle configured to add the data sample to the reservoir of data samples based on a data quality estimate associated with the data sample.

9. The computer-implemented method of claim 8, wherein the selecting the oracle comprises selecting the oracle based at least in part on one or more of types of data associated with the data sample.

10. The computer-implemented method of claim 8, wherein the selecting the oracle comprises selecting the oracle based at least in part on one or more attributes associated with the data sample.

11. The computer-implemented method of claim 8, wherein the selecting the oracle comprises selecting the oracle based at least in part on an oracle identifier included in the configuration data.

12. The computer-implemented method of claim 8, wherein the selecting the oracle comprises selecting the oracle based at least in part on a verified quality measure for the data sample.

13. The computer-implemented method of claim 8, further comprising:
   obtaining, by the computing device, the configuration data from a data stream associated with the data sample.

14. The computer-implemented method of claim 8, further comprising:
   obtaining, by the computing device, the configuration data from a data queue configured to store the data sample and the configuration data.

15. A computer program product, stored on a non-transitory computer readable medium, comprising instructions that when executed by one or more computers cause the one or more computers to:
   determine whether to add a data sample associated with a machine learning model to a reservoir of data samples based at least in part on configuration data associated with the data sample;
   in an instance in which the data sample is to be added to the reservoir of data samples, select an oracle of a plurality of oracles based at least in part on the configuration data; and
   send the data sample to the oracle, the oracle configured to add the data sample to the reservoir of data samples based on a data quality estimate associated with the data sample.

16. The computer program product of claim 15, further comprising instructions that when executed by the one or more computers cause the one or more computers to:
   select the oracle based at least in part on one or more of types of data associated with the data sample.

17. The computer program product of claim 15, further comprising instructions that when executed by the one or more computers cause the one or more computers to:
   select the oracle based at least in part on one or more attributes associated with the data sample.

18. The computer program product of claim 15, further comprising instructions that when executed by the one or more computers cause the one or more computers to:
   select the oracle based at least in part on an oracle identifier included in the configuration data.

19. The computer program product of claim 15, further comprising instructions that when executed by the one or more computers cause the one or more computers to:
   select the oracle based at least in part on a verified quality measure for the data sample.

20. The computer program product of claim 15, further comprising instructions that when executed by the one or more computers cause the one or more computers to:
   obtain the configuration data from a data stream associated with the data sample.

* * * * *